No. 785,684. PATENTED MAR. 21, 1905.
E. A. RUTENBER.
INTERNAL COMBUSTION ENGINE.
APPLICATION FILED JUNE 29, 1903.

WITNESSES:

INVENTOR
Edwin A. Rutenber
BY
ATTORNEYS.

No. 785,684. PATENTED MAR. 21, 1905.
E. A. RUTENBER.
INTERNAL COMBUSTION ENGINE.
APPLICATION FILED JUNE 29, 1903.

WITNESSES:

INVENTOR
Edwin A. Rutenber
BY
ATTORNEYS

No. 785,684. Patented March 21, 1905.

UNITED STATES PATENT OFFICE.

EDWIN A. RUTENBER, OF LOGANSPORT, INDIANA, ASSIGNOR TO THE WESTERN MOTOR COMPANY, OF LOGANSPORT, INDIANA.

INTERNAL-COMBUSTION ENGINE.

SPECIFICATION forming part of Letters Patent No. 785,684, dated March 21, 1905.

Application filed June 29, 1903. Serial No. 163,452.

*To all whom it may concern:*

Be it known that I, EDWIN A. RUTENBER, a citizen of the United States, and a resident of Logansport, in the county of Cass and State of Indiana, have invented a new and Improved Internal-Combustion Engine, of which the following is a full, clear, and exact description.

My invention relates to improvements in internal-combustion engines, the same being herein shown as a multiple-cylinder engine of the four-cycle type, although certain parts of the invention may be employed in other types of engines of this general class.

The improvement consists of a peculiar form of exhaust and carbureter connection which is adapted to rapidly discharge the burned gases without back pressure and which gives the same length of pipe from the carbureter to each cylinder, the latter being an important feature in securing uniform power in all the cylinders of the engine.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1:
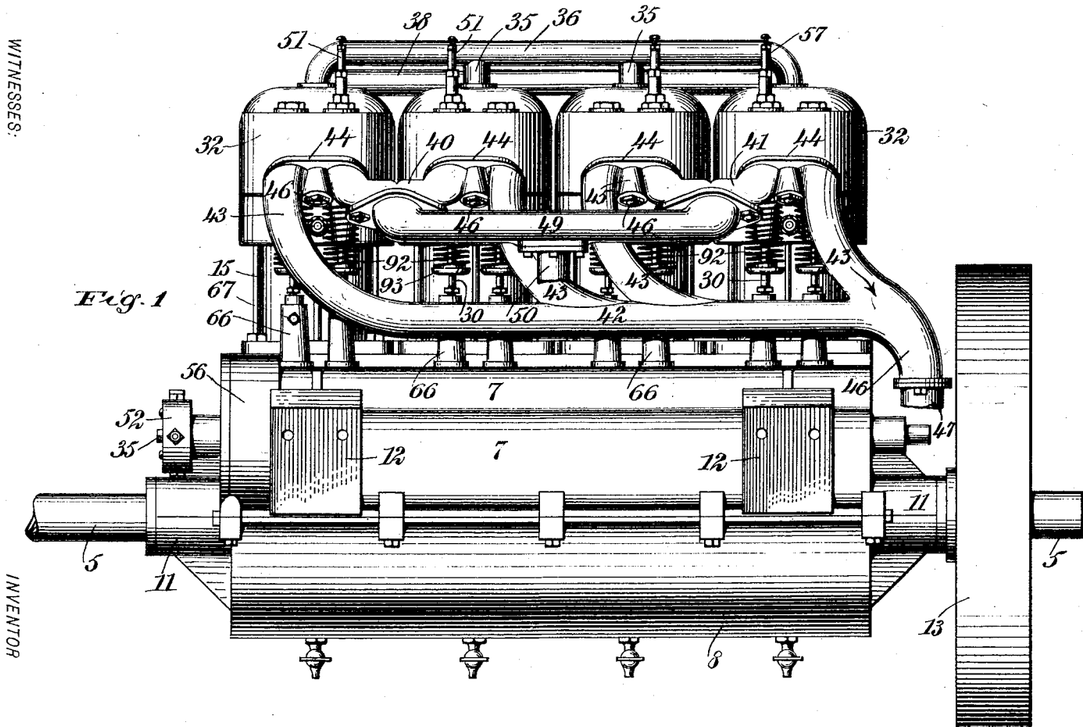
Figure 1 is a front elevation of an internal-combustion engine embodying the improvements of my invention.
Figure 2:
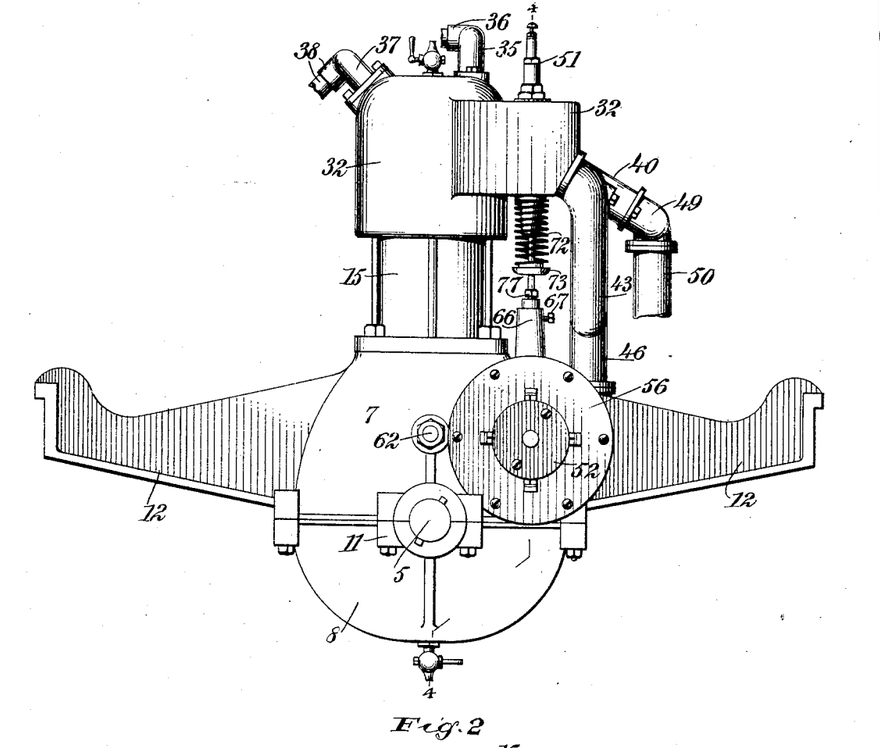
Fig. 2 is an end elevation looking at the left-hand end shown by Fig. 1.
Figure 3:
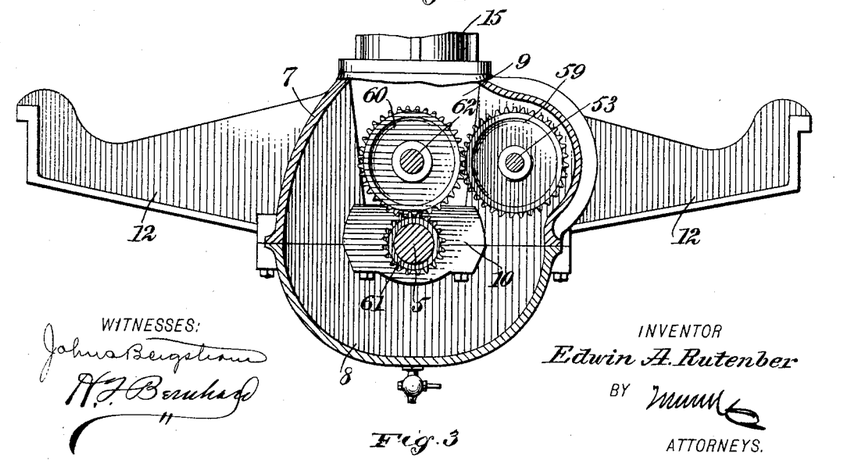
Fig. 3 is a vertical transverse sectional elevation through the gear-casing at the left-hand end of Figs. 1 and 4 and showing the train of gearing between the crank-shaft and the tappet cam-shaft.
Figure 4:
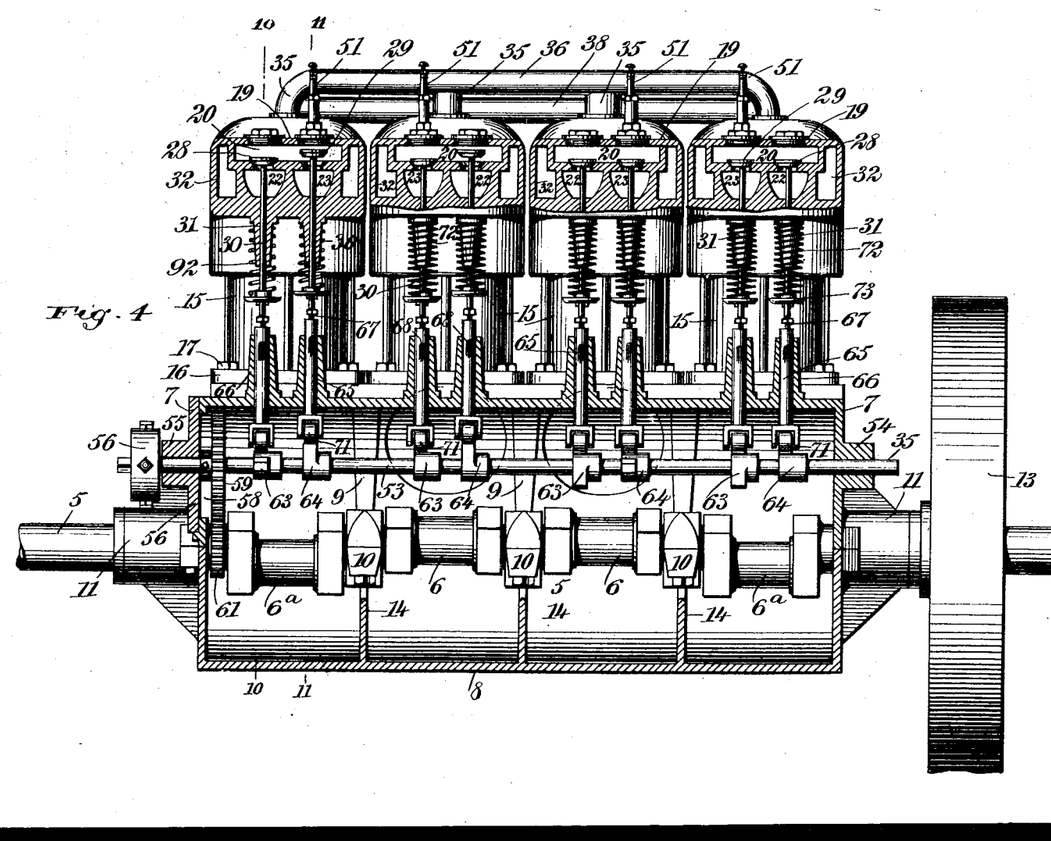
Fig. 4 is a vertical longitudinal sectional elevation taken in the plane indicated by the irregular line 4 4 of Fig. 2.

In carrying my invention into practice I employ a horizontal crank-shaft 5, which is provided with a plurality of cranks 6 6ª, said shaft in the present instance being equipped with a series of four cranks, as shown by Fig. 4. The crank-shaft extends longitudinally through a casing which serves to house the shaft, the gears, and the valve-lifters to be hereinafter described. This casing is divided horizontally in the plane of the bearings for the crank-shaft, thereby producing an upper section 7 and a lower section 8, said sections being flanged and bolted together in a way to secure a tight joint between the parts. The upper section 7 of the gear-casing is provided with a series of hangers 9, which are provided with bearings 10 for the crank-shaft, and the end portion of the upper casing member 7 is also equipped with bearings 11, which are disposed in alinement horizontally with the hanger-bearings 10 for the purpose of supporting the projecting ends of the crank-shaft 5. It will be understood that the lower member 8 of the casing may be readily removed from the upper member for the purpose of having access to the crank-shaft, thus permitting repairs, inspection, or adjustment of the parts within the casing without dismantling the engine. In the type of engine shown by the drawings the upper member 7 of the casing is provided with oppositely-projecting hanger-arms 12, which are adapted to be engaged with certain parts of a motor-vehicle. These hanger-arms provide convenient means for suspending or supporting the motor on a vehicle; but it will be understood that the engine may be used in other relations and arts and also that different means for supporting the engine may be supplied by those skilled in the art. The engine-shaft 5 is shown by Figs. 1 and 4 as having a fly or balance wheel 13 secured to one end thereof. The lower member 8 of the casing is provided with a series of splash-partitions which are cast in one piece with said casing member and are disposed in vertical parallel relation, said partitions 14 lying directly below the hanger-bearings 10 and in the vertical planes of the hangers 9. (See Fig. 4.) The lower member of the casing is adapted to contain a lubricant-bath in which the cranks 6 6ᵃ of the shaft are adapted to be immersed on the rotation of said shaft, and the partitions 14 minimize the splashing of the lubricant and localize the several baths, so that each crank will be supplied with a proper quantity of lubricant.

Figure 5:
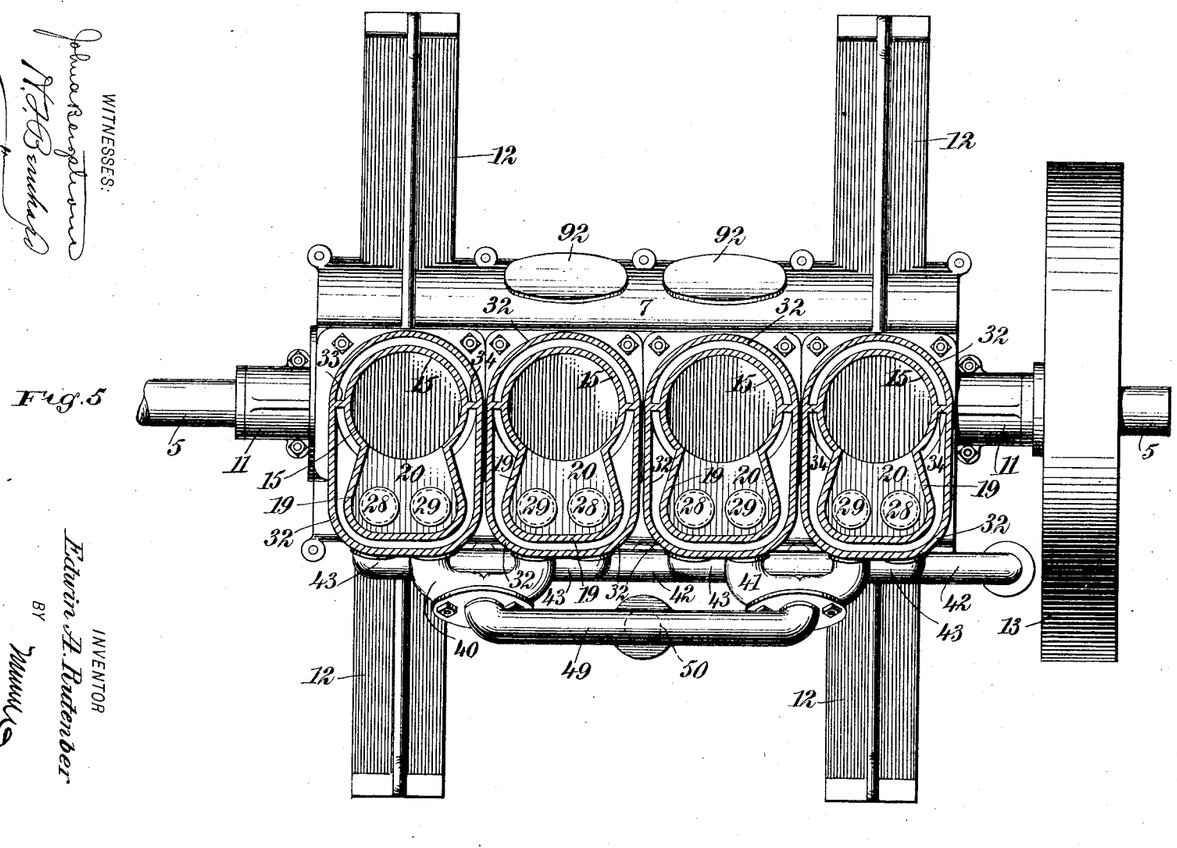
Figs. 5 and 6 are sectional plan views taken in the plane indicated by the dotted lines 5 5 and 6 6, respectively, of Fig. 10.

The engine is equipped with a series of four vertical cylinders 15, which are arranged in a row and are bolted to the upper member 7 of the crank and gear casing, for which purpose each cylinder is provided with a foot-flange 16, adapted to be secured firmly in place by bolts 17 upon the top side of the casing member 7. Each cylinder 15 is open at the lower end for direct communication with the chamber of the crank-casing, while the upper end of the cylinder is closed by means of a head 18, as is usual in the art. One of the peculiar features of my invention is that the cylinder is cast in one piece with valve-boxes for the inlet and exit valves and with a water-jacket, which envelops the working chamber of the cylinder and also envelops the valve-boxes. The cylinder is provided on one side and at its upper portion with a horizontal extension 19, which is made in one piece with said cylinder, said extension forming a tapering throat or passage 20, which increases in width from its line of communication with the upper end of the cylinder toward the front portion of the extension 19, as shown more clearly by Fig. 5 of the drawings. The extension 19 is integral with a bottom or floor plate 21 and with the boxes 22 23, which form chambers 24 25, respectively. The bottom or floor plate 21 of the chambered extension 19 is provided with ports or openings 26 27, adapted to accommodate the exhaust-valve 28 and the inlet-valve 29, respectively, said valves being carried by vertical stems 30, which are arranged to play through the chambers 24 25 and are guided by depending bosses 31, the latter being cast in one piece with the upper part of the cylinder and its water-jacket 32. This water-jacket 32 envelops the upper part of the working chamber of the cylinder 15, and it is so fashioned or arranged as to inclose the front part of the extension 19 and the valve-boxes 22 23, as clearly shown by Figs. 4, 5, 10, and 11 of the drawings.

From the foregoing description it will be understood that the cylinder 15, the extension 19, the valve-boxes 22 23, the floor-plate 21, and the jacket 32 are all cast in a single piece, thereby simplifying the construction and reducing the cost of manufacture.

Figure 10:
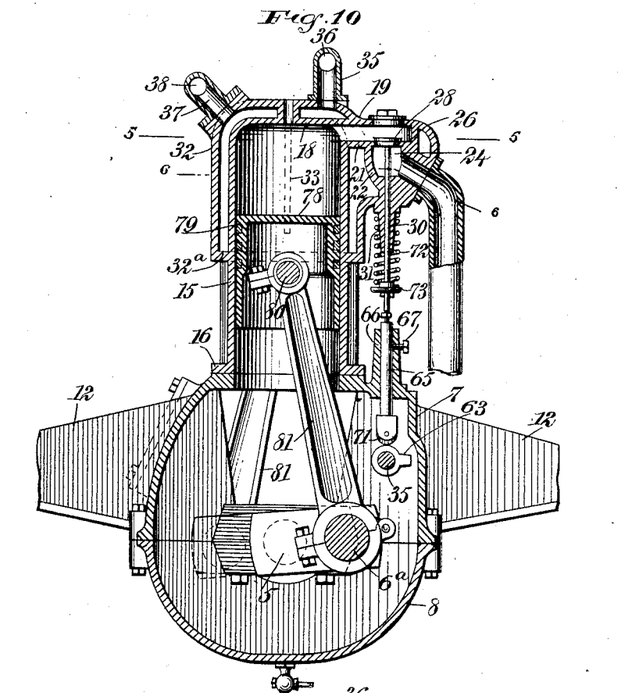
Figs. 10 and 11 are vertical transverse sectional elevations taken in the planes indicated by the dotted lines 10 10 and 11 11, respectively, of Fig. 4.
Figure 11:
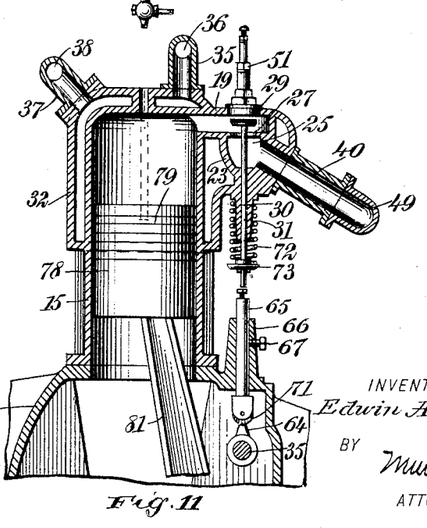

The water-jacket 32 of each cylinder 15 is divided into two chambers or compartments by vertical partitions 33 34, which are cast in one piece with the cylinder and the jacket, said partitions being arranged in vertical positions on opposite sides of the cylinder and in the plane of the vertical transverse axis thereof, the partitions extending from the upper part of the cylinder and the jacket to points just above the bottom or floor 32ᵃ of the jacket, as shown by dotted lines in Figs. 10 and 11. The partitions divide the water-space of the jacket 32 into front and rear compartments, which have communication only at their lower ends, and with the front compartment communicates a short inlet-branch 35 of a water-feed pipe 36, said feed-pipe having a plurality of said branches 25, which are coupled individually to the jackets 32 of the series of cylinders in order to supply the cooling medium to the entire gang or group of cylinders. With the rear compartments of the water-jackets 32 associated with the group of cylinders communicate the series of branches 37, which are preferably made in one piece with an offbearing water-pipe 38, the latter having individual connection with corresponding rear compartments of the water-jackets of all the cylinders in order to carry away the heated water. The pipes 36 38 supply and exhaust the cooling medium to and from the group of cylinders, and this cooling medium is adapted to circulate through the water-jackets in a way to keep the cylinders at a low temperature, so as to prevent premature explosion of the combustible charges which are admitted to the several cylinders by the operation of their valves.

The taper of the throat or chamber 20 in the extension or hood 19 of each cylinder is a special feature of my improved construction, because this throat insures an entirely free opening of the valve for the major portion of its circumference, and this tapered space or chamber also allows the free and unobstructed passage of the spent gases from the cylinder into the exhaust-valve box 24, whereby the spent gases may be discharged very rapidly and without back pressure in the piston-cylinder. The division of the water-space in the jacket surrounding the cylinder insures the circulation of the cold water in a downward direction along one-half of the cylinder, during which time the water is partially heated, and it thence flows below the partitions 33 34 in an upward direction through the remaining half of the cylinder. The employment of the partitions prevents steam from trapping in the water-jacket chamber, and the circulation of the water around the extension or hood 19, the valve-boxes, and the working chamber of the cylinder prevents excessive heating of these parts and the premature explosion of the combustible charges.

Another feature of my invention resides in the peculiar form of exhaust and carbureter connection, which is adapted to rapidly discharge the burned gases and to secure a connection that gives the same length of pipe from the carbureter to each working cylinder, this latter feature being of considerable importance in an engine wherein all the cylinders are designed to give the same power. Said exhaust and carbureter connection in the present invention is made or cast in a single piece of metal in such form or shape that it can be readily applied to the engine for the purpose of having individual connection with the inlet and exhaust valve boxes of the group of cylinders. The described connection consists of the members 40 41, a tubular member 42, a series of legs 43, and face-plates 44. These face-plates are provided with bosses 45 between the members 40 41 and the series of legs 43, and through these bosses pass stud-bolts 46, which are adapted to fasten the series of face-plates 44 individually to the extensions or hoods 19 of the group of cylinders. The hoods 40 41 are each arranged to span the space between two adjacent cylinders, and these hoods have communication at their end portions with the inlet-valve boxes 23 of the four cylinders. The legs 43 are united to the face-plates 44 in a way to have communication with the exhaust-valve boxes 22, and these legs 43 are curved so as to merge or join the tubular member 42 on easy lines, whereby the spent or exhaust gases may be discharged from the cylinders through the exhaust-valve boxes 22 and the legs 43 into the tubular member 42 in a way to facilitate or expedite the discharge of the spent gases without back pressure in the cylinders. The end portion of the tubular member 42 is extended to form a neck 46, to which may be coupled the exhaust-pipe 47, the latter adapted to carry the exhaust to any place of discharge. The several parts comprising the carbureter and exhaust connection are all cast in a single piece of metal—that is to say, the face-plates 44, the hoods 40, the legs 43, and the tubular member 42 are cast in one piece.

Figure 6:
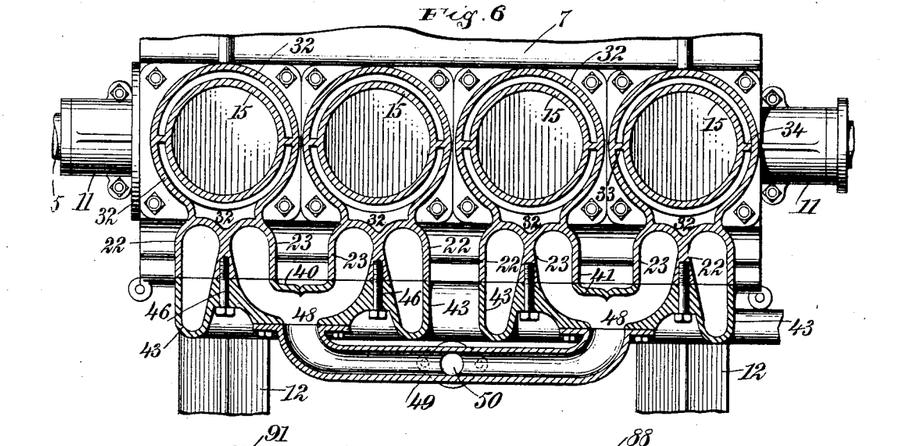

The hoods 40 41 are constructed, as shown more clearly by Fig. 6, in a way to provide two branching passages having a common opening or port 48. With these openings of the two hoods 40 41 communicate the end portions of a carbureter feed-pipe 49, the latter being bolted to the connection and having a depending pipe 50 united to the middle portion of said pipe 49, said feed-pipe 50 being carried to any suitable source of supply, whereby the pipes 49 50 operate to convey the combustible vapor to the hoods 40 41, by which the vapor is distributed to the series of inlet-valve boxes 25, that are associated individually with the group of cylinders.

Each hood or extension 19 for each cylinder supports or carries an electrical igniter 51 of any suitable construction. These electrical igniters are included in an electric circuit, (not shown,) the latter including a circuit maker and breaker 52, which is revoluble with a cam-shaft 53, now to be described.

Figure 9:
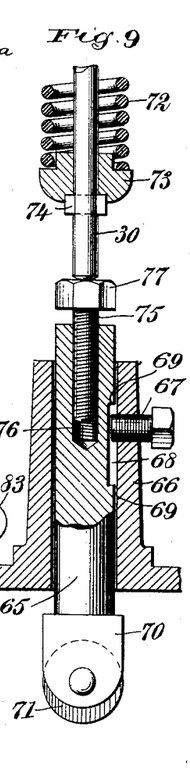
Fig. 9 is an enlarged detail sectional elevation showing one of the cam-lifting stems for a valve suitable for one cylinder.

The cam-shaft 53 is arranged in a horizontal position and extends longitudinally through the crank and gear-casing, said shaft being arranged in a position above and in front of the crank-shaft 5 parallel with the latter. One end of the cam-shaft is journaled in a bearing 54, which is made integral with one end wall of the upper member 7 of the casing, whereas the opposite end portion of said shaft is journaled in a bearing 55, which is made in one piece with a removable plate 56, the latter being bolted to the upper member 7 of the casing and arranged to cover an opening or hole 58. This opening is of such diameter that on the removal of the plate 56 the cam-shaft 53, with the attached cams, can be readily removed from the casing by withdrawing said shaft endwise through the hole. This cam-shaft is adapted to be driven at the required speed by a train of gearing for an end portion of the crank-shaft 5, and in the drawings the train is shown as consisting of gears 59 60 61. The gear 59 is secured rigidly to the cam-shaft 53 near the bearing 55 and within the casing, whereas the gear 60 is idly mounted on a bolt 62, which is fixed to an end wall of the casing member 7. The other gear, 61, is secured to the crank-shaft 5, and the gear 60 occupies an intermediate position between the gears 59 61, so as to transmit the motion from the shaft 5 to the shaft 53. The cam-shaft is also provided with a plurality of tappets or lifting-cams 63 64. Two of these cams 63 64 constitute a pair for controlling the exhaust and inlet valves 28 29, respectively, associated with each cylinder, and the cams of the pair are so arranged with relation to the shaft that the valves will be opened positively at the proper intervals required for the supply of the fresh charges of combustible vapor and the outlet of the spent or exploded gases. The pairs of cams for the several cylinders are arranged in proper positions on the cam-shaft to open the proper valves of the series of cylinders at the desired times; but, as shown, the tappets and the valves are disposed in a way to fire or explode the charges sequentially in any desired order—as, for example, first in either end cylinder, then the third cylinder of the series, after which the fourth cylinder is exploded, and, finally, the charge is fired in the second cylinder. This arrangement, however, may obviously be varied within wide limits, as desired by the manufacturer. With each tappet or cam is associated a valve-lifter of novel construction, the same being shown more particularly by Figs. 4, 9, 10, and 11 of the drawings. Each valve-lifter consists of a stem or spindle 65, which is fitted loosely in one of a series of upstanding hollow bosses 66, cast in one piece with the upper member 7 of the divided gear-casing. This boss 66 is arranged in alinement vertically with the depending boss 31 for the valve-stem 30, and the said boss 66 supports a stop screw or bolt 67, the latter projecting into a flattened face or side 68 on the stem 65, said flattened face forming shoulders 69, adapted to engage alternately with the stop-screw in a way to limit the vertical travel of the spindle 65 in the guide-boss 66. The primary office of the screw 67 is to prevent the spindle 65 from turning on its longitudinal axis and taking an abnormal position with relation to the proper tappet or cam on the shaft 53. The spindle 65 is provided at its lower end with a fork or foot 70, which accommodates a friction-roller 71, the axle or trunnions of which are loosely journaled in the foot 70. (See Fig. 9.) The friction-roller rides on the tappet or cam of the shaft 53, and the spindle is pressed in a downward direction for the roller to have the described engagement with said tappet by the action of a spring 72, which is operatively associated with the valve-stem 30. Said spring fits loosely around the depending guide-boss 31 and the lower part of the valve-stem, the lower part of the spring 72 being seated on a washer 73, that is fitted to the stem 30 and is held against downward movement thereon by a collar or key 74, the latter being attached to the valve-spindle 30.

The valve-stem 30 is arranged in alinement vertically with the valve-lifter spindle 65, and between these parts 30 65 I arrange an adjustable connection, which is embodied in the form of a screw 75. This adjustable screw has its male-threaded shank screwed into a female-threaded socket 76, which is formed axially in the upper part of the spindle 65, and the head 77 of the screw forms a step-bearing for the valve-spindle 30, whereby the spring 72 presses the stem 30 upon the head 77 of the screw 75, and this screw operates to depress the spindle 65 and the roller 71. It is evident, however, that the cam or tappet is adapted to lift the spindle 65 and the stem 30 for the purpose of compressing the spring 72 and opening the valve; but if it is desired to regulate the period of opening or closing the valve the screw 75 may be adjusted in the socket 76 of the lifter-spindle to secure the desired result.

Figure 7:
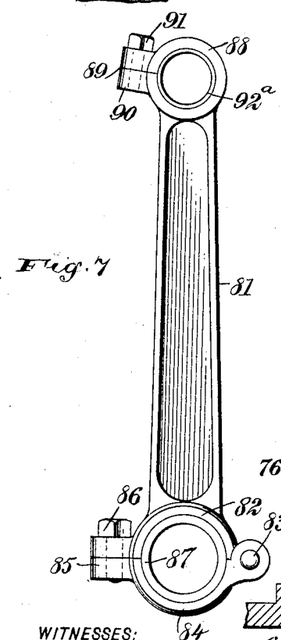
Fig. 7 is an enlarged detail view of one pitman employed to connect one of the pistons with the crank-shaft.
Figure 8:
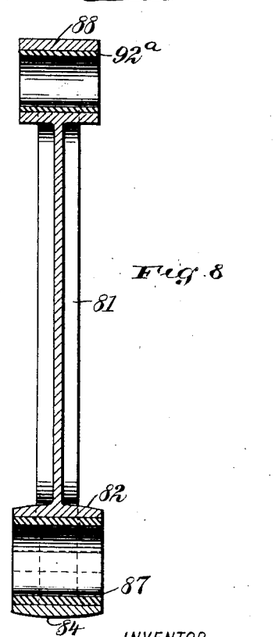
Fig. 8 is a longitudinal section taken transversely through the pitman shown by Fig. 7.

In each cylinder 15 is fitted an ordinary trunk-piston 78, having any desired number of packing-rings 79, and this piston is provided with a transverse pin 80, on which is loosely fitted the upper end of a pitman 81, the latter serving to operatively connect the piston with one of the cranks of the shaft 5. In Figs. 7 and 8 of the drawings I have shown a peculiar construction of the pitman 81. One end of the pitman is provided with a half-bearing 82, to which is pivoted at 83 the other member, 84, of the bearing. The members 82 84 are provided with lugs 85, which are held together by a bolt 86, and this bearing serves to confine a bronze sleeve or ring 87 between its members, said sleeve or ring being adapted for engagement with one of the cranks of the shaft 5. The upper end of the pitman 81 is provided with an eye 88, which is divided or split on a radial line, as at 89, said division extending between the lugs 90, which are clamped together by a screw 91 for holding a wear-ring $92^a$ in the eye. The described construction of the end portions of the pitman provide for the ready assemblage of said pitman with the pin 80 of the piston and the crank of the shaft, and the employment of the rings or sleeves 87 92 minimizes the friction and wear on the shaft and the pitman, said sleeves also providing for ready renewal of the parts in case they are worn.

The upper member 7 of the casing is provided in its rear side with observation-openings adapted to be closed by plates or covers 92. (See Figs. 4 and 5.)

Having thus described my invention, I claim as new and desire to secure by Letters Patent—

1. A multiple-cylinder engine provided with a plurality of valve-chests, inlet and exhaust valves therein, and a combined feed and exhaust connection, said connection comprising exhaust-legs and feed members integral one with the other, and said connection being removable as an entirety from the valve-chests, whereby access is obtainable to all the inlet and exhaust valves.

2. A multiple-cylinder engine provided with a series of valve-chests, inlet and exhaust valves in each chest of the series, and a combined feed and exhaust connection removably secured to said chests; said connection comprising a plurality of exhaust-legs all integral with each other, and said connection being removable in its entirety from the valve-chests, whereby all the valves may be exposed.

3. A multiple engine provided with a series of valve-chests, each chest having separate inlet and exhaust openings on one side of the engine and in the same plane, inlet and exhaust valves in each chest of the series, and a combined feed and exhaust connection removably secured to said chests; said connection comprising a series of individual exhaust-legs and individual feed members all of which are integral; the several legs and members having openings which respectively register with the inlet and exhaust openings of the valve-chests of the series, and the connection being applied and removed in its entirety, whereby all the valves may be inclosed or exposed.

4. A multiple-cylinder engine provided with a plurality of valve-chests, inlet and exhaust valves in each chest, and a two-part combined inlet and exhaust connection removably secured to said chests; one part of said connection having a plurality of exhaust-legs and a plurality of feed members formed in one piece, and the other part of said connection having communication with the feed members of the first-named part; whereby the entire connection may be applied or removed for inclosing or exposing all the valves.

5. A multiple-cylinder engine provided with individual valve-chests, inlet and exhaust valves in each chest, and a two-part feed and exhaust connection for said valves; one part of said connection comprising a plurality of individual exhaust-legs and a plurality of feed members all made in one piece, and the other part of said connection having communication with the feed members of the first-named part; said connection being removable in its entirety from the valve-chests for exposing all the valves, and the second-named part being removable from the first part to allow access only to the inlet-valves.

6. A multiple-cylinder engine provided with individual valve-chests, inlet and exhaust valves in each chest, and a two-part feed and exhaust connection, one part of which is secured as an entirety to the valve-chests for direct individual communication with the respective inlet and exhaust valves, and the other part is secured to the first part for communication with the entire series of inlet-valves only; said parts of the connection being removable collectively and the second-named part being also removable independently of the first-named part.

7. A multiple-cylinder engine provided with a plurality of valve-chests, inlet and exhaust valves in each chest, and a combined feed and exhaust connection; said connection consisting of two parts, one of which comprises a plurality of inlet-hoods and a plurality of exhaust-legs all made in one piece, and the other part of said connection consisting of a single hollow piece secured removably to the inlet-hoods; said connection being detachably secured as an entirety to the chests for the legs and the hoods to communicate, respectively, with the exhaust and inlet valves.

8. An integral feed and exhaust connection for multiple-cylinder engines comprising a plurality of hollow feed members and a plurality of exhaust-legs, said legs and members provided with open sides disposed in the same plane, said legs being united by a common discharge member.

9. A feed and exhaust connection for multiple-cylinder engines comprising a plurality of inlet-hoods and a plurality of exhaust-legs all cast in a single piece, said hoods and the legs having open sides lying in the same plane.

10. A feed and exhaust connection for multiple-cylinder engines comprising two parts, one of which consists of a plurality of exhaust-legs and a plurality of inlet-hoods all formed in one piece, and the other part is a hollow branch united to the inlet-hoods for communication therewith.

In testimony whereof I have signed my name to this specification in the presence of two subscribing witnesses.

EDWIN A. RUTENBER.

Witnesses:
F. B. WILKINSON,
NORA HOOLEY.